Jan. 5, 1960
W. KASTEN
2,919,765
FILTER ELEMENT ASSEMBLY
Filed Dec. 6, 1956
2 Sheets-Sheet 1
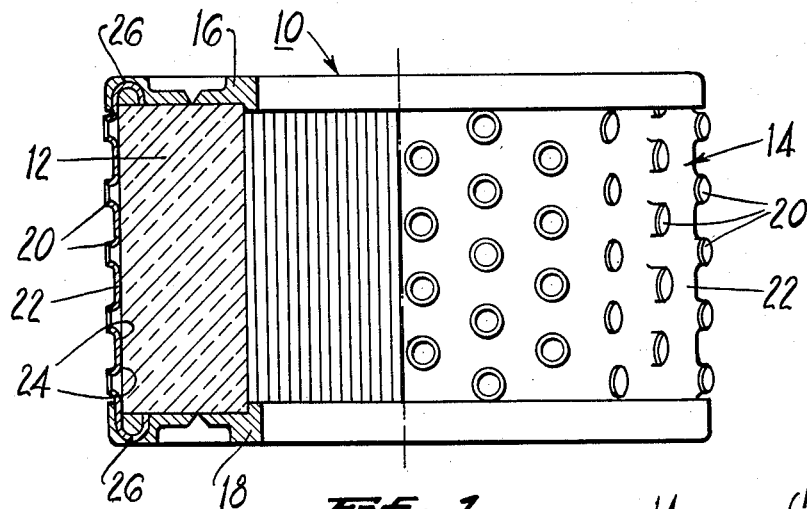
Fig. 1
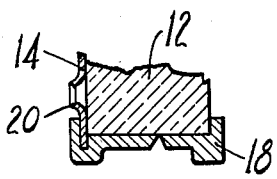
Fig. 4
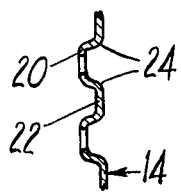
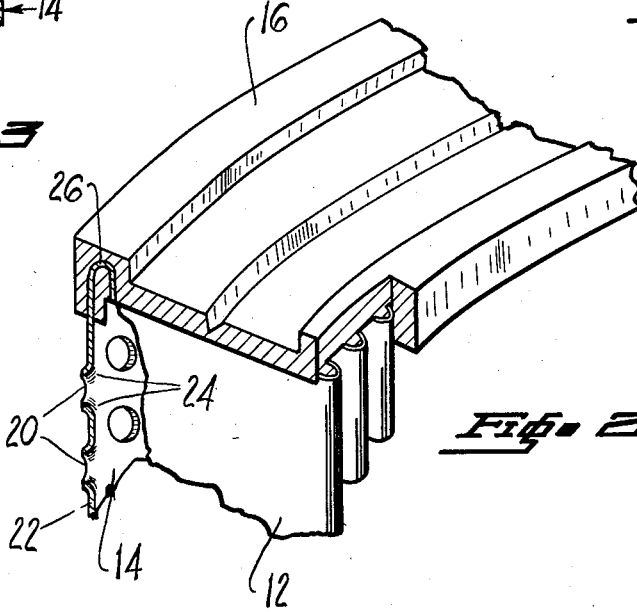
Fig. 3
Fig. 2
INVENTOR.
WALTER KASTEN
BY
William N. Antonis
ATTORNEY United States Patent Office 2,919,765
Patented Jan. 5, 1960

2,919,765

FILTER ELEMENT ASSEMBLY

Walter Kasten, Royal Oak, Mich., assignor to Bendix Aviation Corporation, South Bend, Ind., a corporation of Delaware Application December 6, 1956, Serial No. 626,651

9 Claims. (Cl. 183—71)

This invention relates to filters, and more particularly, to a pleated filter assembly.

There has been a decided trend in the past year towards using pleated paper air filters for automotive use. The problem of properly sealing the pleated ends of the pleated paper element has been solved by molding plastic endcaps on each end in the manner described in Kasten et al. Patent No. 2,771,156. In order to protect the exposed portions of the pleated element and to give added rigidity thereto, screen type wrappers have often been placed around the pleated element and have been embedded in the plastic endcaps along with the pleated ends of the element. It has been found that by using a perforated metal wrapper instead of a screen, that greater rigidity is provided and that the pleated paper element is less likely to be injured since less area of the paper is exposed. Furthermore, the perforated metal wrapper has the added advantage of being cheaper to manufacture than a comparable screen wrapper. One drawback, however, to using regular perforated metal as a wrapper, is that any inward bending of the metal will often cut into and ruin the filter, since the edges of the perforations are relatively sharp. In order to obviate this disadvantage, without added expense, I have provided extruded perforations in the wrapper which have their edges spaced from its outer face. As a result of using such a wrapper, injury to the pleated paper, due to any bending inwardly of the metal, is eliminated, since only rounded edges will contact the paper. Furthermore such embossing tends to increase the rigidity of the metal wrapper even further.

In order to facilitate production of the filter assembly and to improve the seal obtained through use of a plastic endcap, spacing means are provided on the end of the perforated metal wrapper which align the pleated paper member with respect to the wrapper and prevent the member from touching the bottom of the mold during the molding operation.

One of the objects of this invention, is therefore, to produce a pleated filter element with a resilient plastic endcap and a perforated wrapper, the ends of which are embedded in said endcap for reinforcement.

Another object of this invention is to provide a wrapper for a pleated filter having increased rigidity.

A further object of this invention is to provide an embossed perforated wrapper for a pleated filter which will not cut into the filter pleats when forced inwardly.

A still further object of this invention is to provide a wrapper having spacing means on the end thereof for aligning the pleated member with respect to the wrapper and spacing the end of the pleated member a predetermined distance from the bottom of the mold.

Another object of this invention is to provide a plastic endcap on the end of a pleated member whereby the end of the member will be spaced a predetermined distance from the outer face of the endcap, thereby improving the endcap seal.

Other objects and advantages will become apparent from the following description and accompanying drawings, wherein:

Figure 1 is a side elevation, partially in section, of a pleated filter incorporating my invention;

Figure 2 is an enlarged sectional view in perspective of a portion of the filter element with portions of the endcap broken away for clarity;

Figure 3 shows in section another configuration of a wrapper having extruded perforations;

Figure 4 shows in section a portion of a pleated filter element and a metal wrapper embedded in a plastic endcap;

Figure 5:
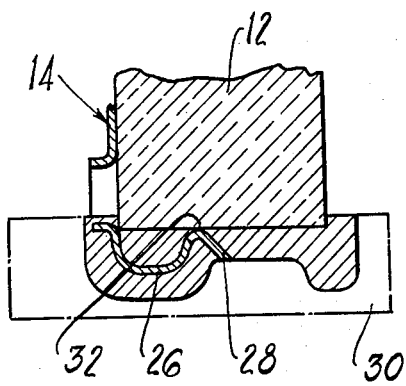
Figure 5 shows an enlarged sectional view of a portion of a pleated member and a perforated wrapper positioned in a mold for forming plastic endcaps on the end thereof, with the section of the wrapper taken on line 5—5 of Figure 6.

Referring to the drawings, numeral 10 designates a filter element comprising a pleated paper portion 12, or other porous or permeable membrane material, a perforated embossed metal wrapper 14, and plastic endcaps 16 and 18 which are molded about the ends of the pleated member 12 and the wrapper 14. The metal wrapper 14 has a multiplicity of perforations which in accordance with my invention have their edges 20 spaced from the outer face 22 of the wrapper. These protuberant areas which bulge beyond the surrounding or adjacent surface give added rigidity to the wrapper 14 and prevent the cutting of the filter paper by the sharp edges 20 of the perforations. Thus, if the metal wrapper is bent inwardly, any likelihood of cutting the filter paper is eliminated, since only rounded edges 24 would contact the pleated paper. A similar result can be achieved by turning the edges 20 of the extruded perforations inwardly, as shown in Figure 3, thereby achieving the added benefit of having a smoother outer surface. The ends of the wrapper 14 are turned inwardly at 26 in order to easily position the pleated filter member with respect to the wrapper. It is possible, however, to eliminate the inwardly turned portion 26 of the metal wrapper 14 as shown in Figure 4, by providing an interference between the diameter of the wrapper and the outer diameter of the pleated element 12. In this manner proper alignment between the two members can also be adequately maintained.

Figure 6:
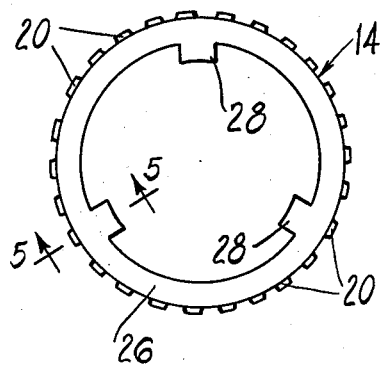
Figure 6 is an end view of the perforated wrapper shown in Figure 5.
Figure 7:
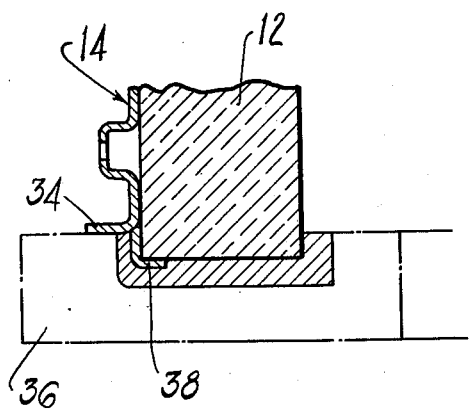
Figure 7 shows in section an alternate method of positioning a pleated member and a perforated wrapper in a mold, with the section of the wrapper taken on line 7—7 of Figure 8.
Figure 8:
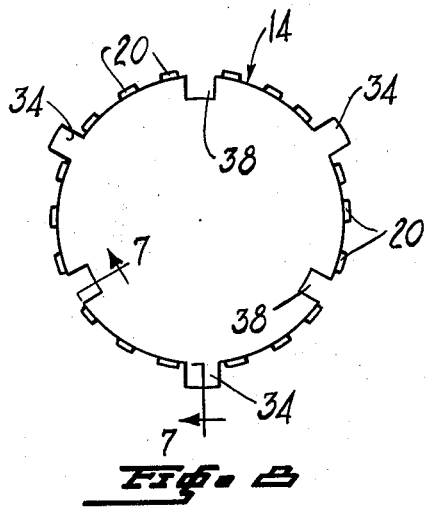
Figure 8 is an end view of the perforated wrapper shown in Figure 7.

Figures 1 and 4 show endcaps which have been molded in a mold having a ridge formed in the bottom thereof. The purpose of the ridge, as explained in Kasten et al. Patent No. 2,771,156 is to space the end of the pleated member 12 from the bottom of the mold so that the pleated member will have properly sealed ends. Figures 5 to 8 show means whereby the spacing member may be incorporated in the metal wrapper 14 so that the seal on the end of the pleated member may be improved. Figures 5 and 6 show a portion of the wrapper having inwardly turned ends 26 with three internal spacing prongs 28 formed thereon. The end of the wrapper is shaped so that the end of the prong 28 rests on the bottom of a mold 30 and the pleated member rests on a portion of the end 26 at a point 32. In this manner the end of the pleated member is spaced from the bottom of the mold and a plastic endcap of predetermined minimum uniform thickness is formed thereon. Figures 7 and 8 show an alternate method of positioning a pleated member and wrapper wherein the end of the wrapper is formed with three external prongs 34 for resting on a mold 36 and three internal prongs 38 which space the end of the pleated member a predetermined distance from the bottom of the mold. Here again the molding operation results in an endcap having a uniform minimum thickness. The internal and external prongs may easily be formed by bending certain portions on the end of the wrapper outwardly and other portions inwardly.

The actual molding operation consists of filling the molds to a predetermined level with a plastic composition known as a "Plastisol." Plastisols consist of (1) a vinyl resin, (2) fillers and/or pigments, (3) one or more plasticizers, and (4) stabilizers. After the mold has been filled with the plastic composition the end of the pleated member 12 and the wrapper 14, with spacing prongs thereon, are immersed in the mold. The plastic composition is then solidified by heating it up to 350–375° F. Upon the application of heat, the liquid fuses together to form a homogeneous uniform mass with the pleated member and wrapper embedded therein.

It can thus be seen that filter assemblies which include pleated paper members, plastic endcaps, and outer wrappers having extruded perforations and spacing prongs in accordance with my invention will have increased rigidity, improved filter protection, and improved endcap seals, since the prongs will eliminate mold spacing ridges or wires in the process of molding endcaps.

Having thus described the various features of my invention, what I claim as new and desire to secure by Letters Patent is:

1. In a filter element having a pleated filter member and an endcap molded to shape with the end of the pleated member embedded therein, a perforated wrapper surrounding said pleated member, said perforations having edges spaced away from the outer face of said wrapper and away from the sides of said pleated member, and means formed on the end of said wrapper for contacting the end of said pleated member and maintaining said pleated member in a predetermined spaced relationship with the outer face of said endcap.

2. A filter element comprising a pleated filter member, a perforated metal wrapper surrounding said pleated member, said perforations being embossed to raise the edges of the perforations away from the outer face of said wrapper and space said edges away from said pleated member, said wrapper having inturned prongs formed on the end thereof for contacting the end of said pleated member and supporting the pleated member within said wrapper, and plastic endcaps closing the ends of said filter element by having the ends of said pleated member and the inturned prongs of said wrapper embedded therein.

3. In a filter element having a pleated filter member and a moldable endcap formed thereon, a perforated metal wrapper surrounding said pleated member, said wrapper having spacing prongs formed on the end thereof for contacting the end of said pleated member and maintaining said pleated member in a predetermined spaced relationship with the outer face of said endcap.

4. A filter element comprising a pleated filter member, a perforated wrapper surrounding said pleated member and having inturned edges formed on the end thereof for contacting the end of said pleated member and supporting the pleated member within said wrapper, and plastic endcaps closing the ends of said filter element by having the ends of said pleated member and said wrapper embedded therein.

5. A filter element comprising a pleated filter member, a perforated metal wrapper surrounding and contacting said pleated member, each of said perforations being embossed and having its entire edge spaced away from the outer face of said wrapper and away from the sides of said pleated member, and plastic endcaps closing the ends of said filter element by having the ends of said pleated member and said wrapper embedded therein.

6. A filter element comprising a pleated filter member, a perforated outer wrapper surrounding and substantially contacting said pleated member, each of said perforations being embossed to raise its entire edge away from the outer face of said wrapper and space said entire edge away from said pleated member, and plastic endcaps closing the ends of said filter element by having the ends of said pleated member and said outer wrapper embedded therein.

7. A filter element comprising a pleated filter member formed of porous fibrous material, a shell-like metal wrapper having perforated sidewalls formed to contact said pleated member along its exposed outer pleated surface and means formed on the end thereof to contact the end of said pleated member to securely support and position said member with respect to said wrapper, said perforations having the edges thereof spaced away from the outer sidewall of said wrapper and away from the exposed outer surface of said pleated member, and a plastic endcap closing an end of said pleated member by having the pleated ends of said filter member and the means formed on the end of said wrapper embedded therein.

8. A filter element comprising a pleated filter member formed of porous fibrous material, a shell-like metal wrapper having perforated sidewalls formed to contact said pleated member along its exposed outer pleated surface and means formed on the end thereof to contact the end of said pleated member to securely support and position said member with respect to said wrapper, and a plastic endcap closing an end of said pleated member by having the pleated ends of said filter member and the means formed on the end of said wrapper embedded therein.

9. A filter element comprising a pleated filter member formed of porous fibrous material, a shell-like metal wrapper having perforated sidewalls formed to contact said pleated member along its exposed outer pleated surface, each of said perforations being embossed and having its entire edge spaced away from the outer sidewall of said wrapper and away from the exposed outer surface of said pleated member, and a plastic endcap closing an end of said pleated member by having the pleated ends of said filter member and the end of said wrapper embedded therein.

References Cited in the file of this patent

UNITED STATES PATENTS

| | | |
|---|---|---|
| 2,016,993 | Dollinger | Oct. 8, 1935 |
| 2,670,055 | Dorman et al. | Feb. 23, 1954 |
| 2,724,868 | Kish | Nov. 29, 1955 |
| 2,732,031 | Rabbitt et al. | Jan. 24, 1956 |
| 2,771,156 | Kasten et al. | Nov. 20, 1956 |
| 2,776,453 | Kish | Jan. 8, 1957 |

FOREIGN PATENTS

| | | |
|---|---|---|
| 326,047 | Great Britain | Mar. 6, 1930 |
| 680,211 | Great Britain | Oct. 1, 1952 |